(12) United States Patent
St. Amand et al.

(10) Patent No.: US 6,499,526 B1
(45) Date of Patent: Dec. 31, 2002

(54) UMBILICAL CABLE BONDING TOOL

(75) Inventors: Raymond A. St. Amand, Fairhaven, MA (US); Ronald E. Sprague, Portsmouth, RI (US); John H. Pelto, Swansea, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 143 days.

(21) Appl. No.: 09/685,149

(22) Filed: Oct. 11, 2000

(51) Int. Cl.[7] ............................................... B30B 15/00
(52) U.S. Cl. ....................... 156/581; 156/580; 100/212
(58) Field of Search ................................. 156/580, 581, 156/583.1, 583.3; 100/211, 212

(56) References Cited

U.S. PATENT DOCUMENTS

| | | | | |
|---|---|---|---|---|
| 4,511,425 A | * | 4/1985 | Boyd et al. | ................. 156/493 |
| 4,529,472 A | * | 7/1985 | Hsu | ............................ 156/498 |
| 5,078,820 A | * | 1/1992 | Hamamura et al. | ......... 156/267 |
| 5,300,170 A | * | 4/1994 | Donohoe | ..................... 156/235 |

* cited by examiner

*Primary Examiner*—James Sells
(74) *Attorney, Agent, or Firm*—Michael J. McGowan; Michael F. Oglo; James M. Kasischke

(57) ABSTRACT

A bonding tool includes an aluminum metal alloy bar member of a predetermined width, the bar having an upper surface, a lower surface, and opposing longitudinal edges. A resilient material is adhesively joined with the bar, the resilient material having an upper surface, a lower surface and opposing longitudinal edges. The joining of the resilient sponge material to the bar is such that an entire upper surface of the sponge material is coextensive with an entire lower surface of the bar member. The bonding tool is made in several, for example five, sections and is laid on a cable for bonding the cable to a capsule or the like in a separate process. The sections are keyed so as to interlock one to another.

24 Claims, 1 Drawing Sheet

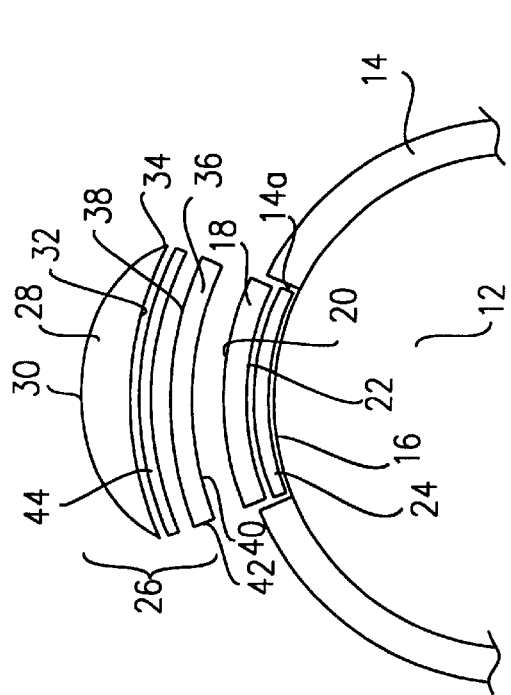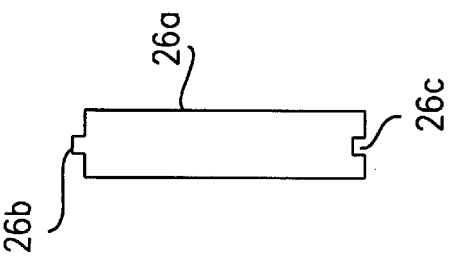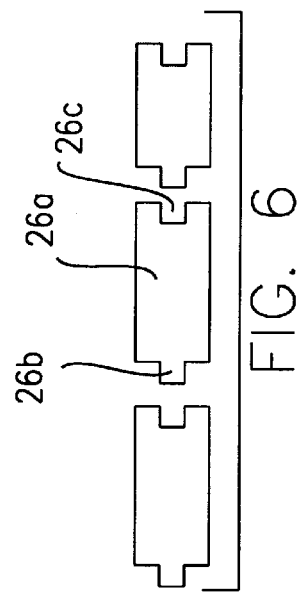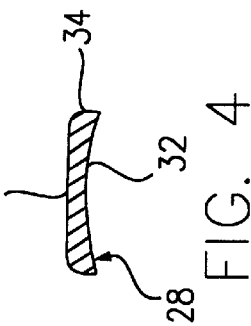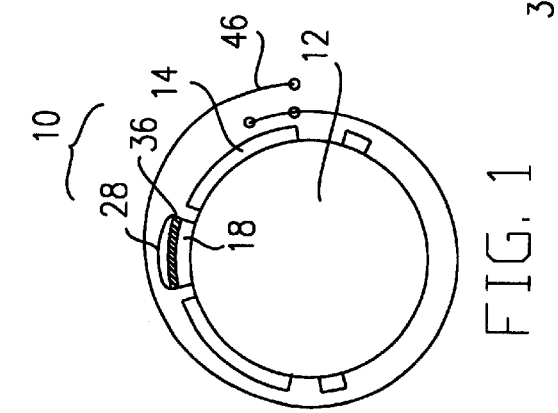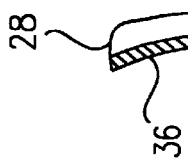

UMBILICAL CABLE BONDING TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a cable bonding tool. More particularly, the invention relates to a cable bonding tool having an aluminum alloy portion and an elastomeric sponge portion, the sponge portion in contact with the cable, and thereby preventing damage thereto.

(2) Description of the Prior Art

The current art for cable bonding tools is limited. Prior to the present invention, there was no device specifically intended for the bonding of the Capsule Launching System (CLS) umbilical cable to a capsule. Typically a length of wood such as a 2×4 was utilized to bond the umbilical cable. This resulted in an inferior adhesive bond line thickness as the 2×4 dimensions and the contact surface shape did not match the contour of the CLS capsule outer diameter.

Thus, a problem exists in the art whereby a device for specifically bonding an umbilical cable to a capsule is not known.

The following patents, for example, disclose various types of bonding cables, but do not disclose a tool for the adhesive bonding of an umbilical cable to a capsule.

U.S. Pat. No. 2,786,393 to Grimes;
U.S. Pat. No. 3,518,613 to Alpert;
U.S. Pat. No. 3,883,209 to Kongelbeck;
U.S. Pat. No. 4,047,464 to Rederiksson et al.;
U.S. Pat. No. 4,099,038 to Purdy;
U.S. Pat. No. 4,184,731 to Betzmeir;
U.S. Pat. No. 5,652,404 to Girard; and
U.S. Pat. No. 5,710,388 to Hutchinson et al.

Specifically, the patent to Grimes discloses a monitoring cable release mechanism for a missile having an umbilical plug or connector adjacent one end thereof, a support line attached to the cable, a member to which the support line is attached, a pair of latches pivotally carried by the member for releaseably attaching the member to the missile shell, and means for releasing the latches. The means include a sector shaped release arm pivotally mounted on the member, the release arm having pins received by the latches when the latter are in latching position, a second line having one end attached to the release arm and the other end attached to the plug, whereby when the plug is released, it acts to unlatch the latches thereby permitting the cable to fall clear of the missile.

Alpert discloses a missile umbilical cable adapted to interconnect a missile and a launcher prior to launch and having a mechanical linkage interconnecting the missile and launcher to cause automatic disengagement of the umbilical from the missile upon launch in the absence of shearing forces and consequent destruction of the interconnecting pins or electrical components.

Kongelbeck is directed to a missile connector for providing electrical connections to an aerial missile from a missile launcher of the box type. A novel feature resides in the provision of structure which allows limited shifting movement of the missile in the launcher without disturbing these electrical connections.

Rederiksson et al. disclose a device for breaking the connection between an electric control system and a missile by separating a control cable or umbilical cord joining the missile to its launcher housing during launch. A plurality of continuous, flexible conductors are passed through openings in a non-conductive insert in the surface of the missile. Because the conductors are secured to both the missile and the housing on opposite sides of the insert, they are tensioned against and bent over the outer edge of the opening during launch and broken due to the concentration of tensile and bending stress at the point of contact.

Purdy discloses a peel-away flat cable for providing electrical connection to a missile. First and second flat cables, each having a plurality of spaced conductors, are electrically connected together and are bonded to one another. A breakaway joint is provided in the cable to provide ready separation after the cable has performed its desired function.

Betzmeir relates to an electrical connector designed for use inside a tube such as an ejector tube for the expulsion of bodies from the tube, whereby the electrical connector is ejected from the tube together with the respective body, such as a mine. As soon as the body leaves the tube, the connector automatically separates itself from the ejected body and falls apart. For this purpose the components of the electrical connector are so shaped that they cooperate for making electrical contact only inside the tube.

Girard discloses a device for disconnecting a releasable connector for connecting a flexible connecting element of an umbilical tower to a launcher of the type comprising a base fixed on the launcher and adapted to receive a plug connected to the flexible connecting element and comprising pull-away means for releasing the plug upon firing the launcher connected to an end of a pulling element. The device comprises an element capable of breaking upon firing the launcher for fastening the flexible connecting element to the launcher.

Hutchinson et al. discloses an umbilical cord for connecting the control systems within a control center to the operating systems of a projectile that is located within a launch tube and is to be launched therefrom, the umbilical cord comprising a cable having a plurality of conductors therein and having a control center end and a projectile end, a first connector terminated to the conductors at the control center and at a second connector terminated to the conductors at the projectile end, the second connector having insulation displacement contacts therein where the conductors are terminated and the second connector is captivatively pluggable into a recess in the side of the projectile through a port in the launch tube and upon the launching of the projectile, the connector remains with the projectile and the conductors remain with the launch tube, whereby the conductors are pulled free from the insulation displacement contacts.

It should be understood that the present invention would in fact enhance the functionality of the above patents by providing a simple tool for the adhesive bonding of an umbilical cable to a capsule or the like.

SUMMARY OF THE INVENTION

Therefore it is an object of this invention to provide a bonding tool.

Another object of this invention is to provide a bonding tool for adhesively securing a cable to a capsule.

Still another object of this invention is to provide a bonding tool having at least a bar portion and a resilient portion coextensively bonded together.

A still further object of the invention is to provide a bonding tool having a metal alloy bar portion and a resilient sponge portion bonded to the metal alloy.

Yet another object of this invention is to provide a bonding tool which is simple to manufacture and easy to use.

In accordance with one aspect of this invention, there is provided a bonding tool including an aluminum metal alloy bar member of a predetermined width, the bar having an upper surface, a lower surface, and opposing longitudinal edges. A resilient material is adhesively joined with the bar, the resilient material having an upper surface, a lower surface and opposing longitudinal edges. The joining of the resilient sponge material to the bar is such that an entire upper surface of the sponge material is coextensive with an entire lower surface of the bar member. The bonding tool is made in several, for example five, sections and is laid on a cable for bonding the cable to a capsule or the like in a separate process.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 1 is a sectional side view of a partly expanded cable bonding assembly according to a first preferred embodiment of the present invention;

FIG. 2 is an exploded side view of the cable bonding assembly of the present invention without a cable;

FIG. 3 is a sectional side view of the bonding tool alone of FIG. 1;

FIG. 4 is a sectional view of the aluminum alloy structure of the bonding tool shown in FIG. 2;

FIG. 5 is a plan view of the bonding tool shown in FIG. 2; and

FIG. 6 is a top plan view of separate sections of the bonding tool as they would be assembled.

DESCRIPTION OF THE PREFERRED EMBODIMENT

In general, the present invention is directed to a bonding tool. More specifically, the present invention is directed to a bonding tool which provides a reliable mechanism for bonding an umbilical cable to a Tomahawk CLS capsule. As indicated, there has previously been no device specifically intended for the bonding of a CLS umbilical cable. Typically, a 2×4 was utilized to bond the umbilical cable. This resulted in an inferior adhesive bond line thickness as the 2×4 did not match the contour of the CLS capsule outer diameter.

Referring first to FIG. 1, the cable bonding assembly 10 is shown therein. The cable bonding assembly 10 in whole is shown to illustrate a preferred application of a bonding tool 26 to a device in the industry, and is not intended to be limiting to this application.

Continuing, and referring to both FIGS. 1 and 2, the cable bonding assembly 10 is further shown to include a capsule 12. This capsule 12 represents the Tomahawk CLS capsule and is generally cylindrical in shape. Plates 14 are secured to capsule 12 in a spaced apart relationship so as to form recessed site 14a throughout an entire longitudinal surface thereof. Within the recessed site 14a, there is an exposed surface 16 upon which is seated an umbilical cable 18.

The umbilical cable 18 is intended to be secured to the exposed surface 16 of the capsule 12 by an adhesive 24. Once the umbilical cable 18 is set on the adhesive 24, the bonding tool 26 is laid thereon and secured by straps 46. The bond pressure is applied by placing and tightening the ratchet straps 46 (or equivalent) over the bonding tool 26 and around the outer diameter of capsule 12 and plates 14. In use, there are preferably five (5) tool 26 segments which are laid upon the entire length of the cable 18. FIG. 5 illustrates one such segment 26a.

Each segment 26a has a key 26b protruding from an end thereof and a key slot 26c formed in the opposite end and shaped to receive a key 26b from another segment 26a. Thus the segments 26a are made to interlock with one another as shown in FIG. 6. The use of the multiple tool segments 26a to form an entire length of tool 26 enables easy transport of the tool 26 and application to varying length devices.

Referring now more specifically to FIG. 3 and FIG. 4 of; the drawings, the tool 26 detail is better shown and further explained. The bonding tool 26 includes a rigid bar portion 28 and a resilient material portion 36. The bar portion 28 is formed to include an upper surface 30, a lower surface 32 opposite the upper surface, and opposing longitudinal edges 34. The bar portion, as mentioned above, is formed as a keyed segment 26a, it being understood that a plurality of linearly placed segments 26a will be used in an actual application of the tool 26, each segment. 26a keyed and interlocked with its adjacent segments. The bar portions 28 are fabricated from, for example, an aluminum alloy. The lower side 32 of the bar portion 28 which interfaces with the umbilical cable 18 is contoured to match the outer diameter of the capsule 12. The width of the bonding tool 26 matches that of the umbilical cable 18, thus ensuring that the bonding pressure is distributed over the entire cable width yet allowing for inspection of the bond line along the entire length of the umbilical cable 18.

The resilient material 36 also includes a material upper surface 38, a material lower surface 40, and opposing longitudinal edges 42. The resilient material 36 is, for example, a sponge elastomer bonded to one side (in this instance, the lower side 32) of the bar portion 28 so as to prevent damage to the umbilical cable 18 when the tool 26 is pressed thereagainst and to provide an even distribution of the bonding pressure. In order to bond the bar portion to the elastomeric material 36, an adhesive 44 is applied therebetween and dried prior to use of the tool 26.

The advantages of this device over the previously used device are numerous, including a much more even adhesive bond line thickness, which is desirable during adhesive bonding applications. In addition, the tool is formed in predetermined keyed segments and is therefore easier to use and transport. Further, the sponge elastomer provides better protection against umbilical cable damage during the bonding operation.

There are currently no alternative constructions of the invention. However the materials selected are not critical to the function of the device. The length of the tool segments could also be varied with little or no impact to the device operation. Additionally, the segments need not be keyed if such a relationship is not warranted for a particular application. Further, the ratchet straps could be replaced by any means that can apply a suitable force to hold the bonding tool against the cable and thus the cable against the capsule.

Accordingly, it is anticipated that the invention herein will have far reaching applications other than those of securing an umbilical cable member to a capsule.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A bonding tool comprising:
    a bar member of a predetermined width, said bar having an upper surface, a lower surface, and opposing longitudinal edges;
    a resilient material corresponding in width to and superposed on an entirety of the upper surface of said bar member, said resilient material having an upper surface, a lower surface and opposing longitudinal edges; and
    means for bonding said resilient material to said bar member.

2. The bonding tool according to claim 1 wherein the entire lower surface of said bar member is shaped to conform to the entire upper surface of said resilient material.

3. The bonding tool according to claim 1 wherein said bar member is a metal alloy.

4. The bonding tool according to claim 1 wherein said resilient material is elastomeric.

5. The bonding tool according to claim 1 wherein the upper surface of said resilient material is fixed to the lower surface of said bar member.

6. The bonding tool according to claim 2 wherein the upper surface of said resilient material is fixed to the lower surface of said bar member.

7. The bonding tool according to claim 5 wherein said tool includes a plurality of keyed segments, each keyed segment including a body portion, a key portion at a first end of the body portion, and a key slot at an opposing end of the body portion, the key slot of one segment receiving the key portion of an adjacent segment.

8. The bonding tool according to claim 6 wherein said tool includes a plurality of keyed segments, each keyed segment including a body portion, a key portion at a first end of the body portion, and a key slot at an opposing end of the body portion, the key slot of one segment receiving the key portion of an adjacent segment.

9. An apparatus for bonding a cable to a capsule comprising:
    a capsule having a characteristic surface;
    a plurality of plates longitudinally aligned on the characteristic surface of said capsule;
    at least one cable longitudinally aligned on the characteristic surface of said capsule and between adjacent ones of said plurality of plates;
    a bar member of a predetermined width superposed on each of said at least one cable, said bar having an upper surface, a lower surface, and opposing longitudinal edges;
    a resilient material corresponding in width to and superposed on an entirety of the upper surface of said bar member, said resilient material having an upper surface, a lower surface and opposing longitudinal edges;
    means for bonding said resilient material to said bar member; and
    means for compressing the resilient material against said at least one cable to effect the bonding of the cable to the capsule.

10. The bonding apparatus according to claim 9 wherein the entire lower surface of said bar member is shaped to conform to the entire upper surface of said resilient material.

11. The bonding apparatus according to claim 9 wherein said bar member is a metal alloy.

12. The bonding apparatus according to claim 9 wherein said resilient material is elastomeric.

13. The bonding apparatus according to claim 9 wherein the upper surface of said resilient material is fixed to the lower surface of said bar member.

14. The bonding apparatus according to claim 10 wherein the upper surface of said resilient material is fixed to the lower surface of said bar member.

15. The bonding apparatus according to claim 9 wherein the lower surface of said bar member is a same surface area as an entirety of the upper surface of said resilient material.

16. The bonding apparatus according to claim 13 wherein said bar member and resilient material include a plurality of keyed segments, each keyed segment including a body portion, a key portion at a first end of the body portion, and a key slot at an opposing end of the body portion, the key slot of one segment receiving the key portion of an adjacent segment.

17. The bonding apparatus according to claim 14 wherein said bar member and resilient material include a plurality of keyed segments, each keyed segment including a body portion, a key portion at a first end of the body portion, and a key slot at an opposing end of the body portion, the key slot of one segment receiving the key portion of an adjacent segment.

18. The bonding apparatus according to claim 14 wherein said means for compressing includes a strap surrounding the capsule and extending over the upper surface of the bar member, tightening said strap about the capsule and bar member resulting in the resilient material compressing the cable against a bond material applied to the capsule.

19. The bonding tool according to claim 1 wherein said means for bonding is adhesive.

20. The bonding apparatus according to claim 9 wherein said means for bonding is adhesive.

21. A bonding tool comprising:
    a plurality of keyed bar segments, each keyed bar segment including a body portion, a key portion at a first end of the body portion, and a key slot at an opposing end of the body portion, the key slot of one segment receiving the key portion of an adjacent bar segment, each bar segment being of a predetermined width and having an upper surface, a lower surface, and opposing longitudinal edges;
    a resilient material mateable with said plurality of keyed bar segments, said resilient material having an upper surface, a lower surface and opposing longitudinal edges; and
    means for bonding said resilient material to said plurality of keyed bar segments wherein the upper surface of said resilient material is fixed to the lower surface of said plurality of keyed bar segments.

22. The bonding tool according to claim 21 wherein the lower surface of each said bar segment is shaped to conform to the upper surface of said resilient material.

23. The bonding tool according to claim 21 wherein each said bar segments is formed of a metal alloy.

24. The bonding tool according to claim 21 wherein said resilient material is elastomeric.

* * * * *